Figure 1:
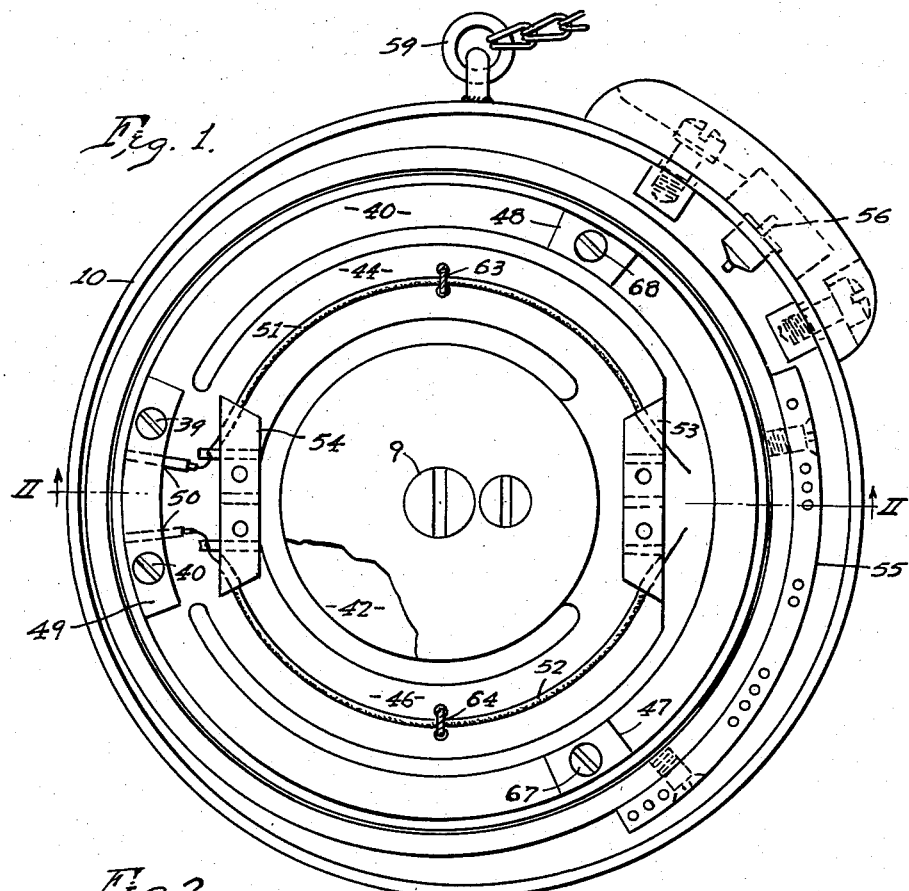

June 9, 1959

T. BARDEEN 2,890,438

SEISMOMETER

Filed Dec. 8, 1954

INVENTOR.
Thomas Bardeen.

BY
ATTORNEY:-

United States Patent Office 2,890,438
Patented June 9, 1959

2,890,438
SEISMOMETER

Thomas Bardeen, Fox Chapel, Pa., assignor to Gulf Research & Development Company, Pittsburgh, Pa., a corporation of Delaware Application December 8, 1954, Serial No. 473,817

8 Claims. (Cl. 340—17)

This invention concerns apparatus for detecting seismic vibrations and in particular concerns an electromagnetic seismometer which is especially useful in geophysical prospecting.

In the well-known seismic method of geophysical prospecting, a ground disturbance usually in the form of an explosion is initiated at one point and travels through the earth to be reflected and refracted eventually to reach a receiving point where a seismometer or geophone detects its arrival. The receiving seismometer generates a signal in response to the disturbance and vibrations received, which signal is amplified and permanently recorded for subsequent analysis and interpretation. Various types of seismometers are in common use, one type being the so-called electromagnetic seismometer in which the instrument case houses a permanent magnet within whose field a coil is elastically suspended. The seismometer is "planted" on the ground at the receiving location so that its case partakes of the ground motion, and the vibration-induced relative motion between the magnet and the elastically-suspended coil induces an E.M.F. in the coil which forms the output signal of the seismometer.

In the design of seismometers there are several factors which should be taken into account. One of these is that the seismometer should effect a minimum of loading on the ground, since otherwise the entire seismometer mass resting on the non-rigid ground forms a mechanical filter which seriously distorts the received vibrations and materially reduces the signal strength. In order to meet this desideratum, the seismometer case is often given a broad base so as to distribute its weight over a large area. This, however, is not an efficient expedient because it increases the overall weight of the equipment which the seismic field party must handle, an important point in view of the fact that it is not unusual for a single seismic party to set out a hundred such seismometers or geophones at one time. This invention provides a seismometer whose active operating mechanism is in the form of a broad disk, thus attaining the above desideratum and having optimum efficiency without adding ineffective weight. In addition the low squat form of the seismometer minimizes its sensitivity to wind noises.

Another design parameter which is known to affect the sensitivity of an electromagnetic seismometer is the volume of the air gap which is occupied by the elastically-suspended coil. Since the maximum attainable magnetic flux density in the air gap is limited by the magnetic properties of the permanent-magnet material used in the magnet, it is necessary to increase the volume of the coil-occupied air gap in order to increase the sensitivity of the seismometer. This in turn increases the volume and weight of the magnet and of the entire seismometer. This invention provides a seismometer whose permanent magnet is in such a form as to allow the coil-occupied air gap to be located near the outer edge of the active operating mechanism, thus providing maximum sensitivity for the size and weight of the magnet.

A further point is that geophysical prospecting seismometers are often used in proximity to high-tension lines and are subject to 60 cycle A.-C. or other pick up which must be neutralized by a so-called hum-bucking coil. This invention provides such a coil but in a form so as to be useful also for another purpose, thus reducing weight still further. In assembling the permanent-magnet structures for seismometers, the maximum flux from the magnet can be obtained only if the magnet is magnetized after assembly. This is customarily done by means of a magnetizing coil on the structure and momentarily passing a large D.-C. through the coil to magnetize the magnet, and the magnet structure is thereafter not disassembled. This invention provides a seismometer in which a single coil is used for initially magnetizing the permanent-magnet structure and subsequently used for hum-bucking purposes.

In addition, this invention provides a seismometer which is simple and inexpensive to construct, at the same time being mechanically rugged to withstand rough handling in large numbers in the field. Being disk-shaped, the seismometer of this invention will land on its flat surface when dropped to the ground from a truck, or if it should land on edge it can readily be turned flat from a distance by a mere flick of the connecting cable.

The above-mentioned and other desirable objects of this invention have been attained by this invention in the manner explained in the following specification of which the drawing forms a part and in which—

Figure 2:
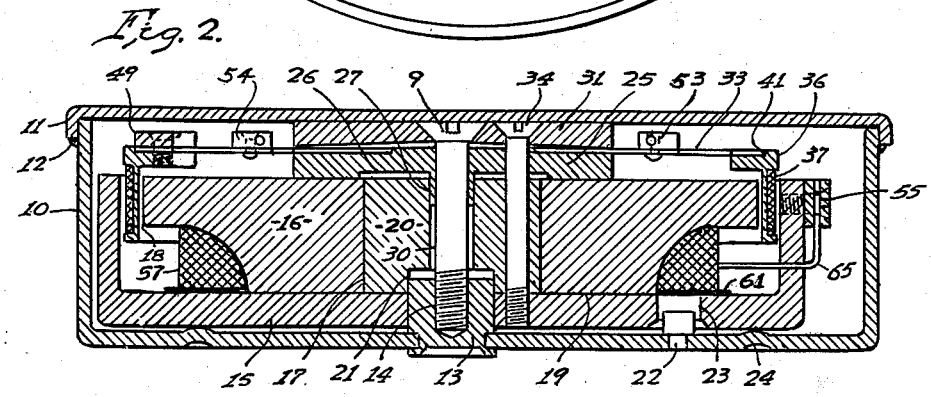
Figure 3:
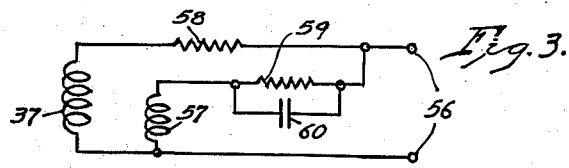

Figure 1 is a plan view of the seismometer of this invention with the top cover removed, and Figure 2 is a cross-sectional view of the seismometer of Figure 1 taken along the line II—II, and Figure 3 is a wiring diagram of the seismometer.

The structure of the seismometer of this invention comprises a shallow cup-shaped case containing a magnetic structure of generally flat annular shape having a permanent magnet which is magnetized in a substantially radial direction, and a flux-return yoke contacting the magnet at its central portion but which is separated from the magnet at its outer periphery so as to form an air gap of large diameter within which the coil is elastically suspended, a coil wound in the annular space between the permanent magnet and the flux-return yoke serving both for magnetizing the permanent magnet and for hum-bucking purposes, all as described in more detail by reference to the drawing.

Referring to the drawing, an outer case 10 has the form of a shallow cup with a tightly-fitting lid 11 which may, after complete assembly, be sealed to make a water-tight case as by soldering 12. A boss 13 is fastened to the bottom of the case 10 by peening and soldering as shown, the boss 13 being drilled and tapped at 14 to provide means for securely mounting the active operating mechanism inside the case by means of screw 9. The boss 13 is located slightly off the center of the case as shown. The case 10, lid 11, and boss 13 are made of non-magnetic material such as brass.

The active operating element of the seismometer comprises a soft iron, shallow cup-shaped yoke 15 whose bottom is drilled to fit snugly on the boss 13. An inner permanent magnet 16, made of permanent-magnet material of high coercive force such as Alnico V, has an annular shape with a central hole 17 and outer cylindrical face 18 which is smaller in diameter than the inside diameter of the yoke 15 so as to form an air gap between the rim of the yoke 15 and the outer face 18 of the magnet 16. The magnet 16 has an axial dimension or thickness near its center which is substantially smaller than its radial dimension. The axial dimension of the outer face 18 is smaller than the magnet thickness at the central hole 17, thus forming a central protuberance or boss which is in contact with the bottom of yoke 15 and has an annular space around it. The boss of magnet 16 has a smooth flat bottom face 19 which makes good magnetic contact with the central area of the yoke 15. While the magnet 16 is shown having an annular shape with a central boss, it may alternatively be disc-shaped with a central boss, the important characteristic being that it have a larger radial dimension than axial dimension, and that the axial dimension at the central boss be greater than the axial dimension of the outer face 18.

In order to facilitate manufacture of the magnet 16, it may have a radial slot (not shown) which allows for a certain amount of expansion and contraction incident to manufacture and prevents cracking of the relatively brittle Alnico V during heat treatment of the magnet 16. The central hole 17 of the magnet has a nonmagnetic plug 20 which is made of a relatively soft low-melting-point alloy, such as the material known as Cerramatrix, which material is customarily used as a metallic insert for Alnico V. The plug 20 has a hole 30, substantially larger than screw 9, which hole is also counterbored at 21 to fit snugly on the boss 13 whereby the magnet 16 and its yoke 15 are held accurately concentric. This insure that the annular air gap shall be accurately uniform all the way around the magnet.

It is apparent that the magnetic circuit of the seismometer comprises the magnet 16, which must be permanently magnetized substantially in a radial direction, the air gap, the rim of the yoke 15, and the base of the yoke 15. The permanent magnet 16 is magnetized radially so that it has one pole at its outer face 18 and the other at its central boss. The outer face 18 is homopolar and the flux across the air gap is radial throughout. A pin 22 riveted into the case 10 engages a hole 23 in the yoke 15 to prevent the assembly from rotating inside the case. Three dimples as shown at 24 may be pressed in the bottom of case 10 so that the inner assembly will rest in the case without rocking. These dimples also space the inner assembly from the outer case slightly so that hard blows causing dents in the case during use will not strain or loosen the inner assembly.

A clamping disk 25 is provided on top of the magnet as shown, this disk being recessed slightly at 26 over the plug 20, and having an extension 27 which fits snugly into the central hole of the plug 20, and a hole which fits snugly around the screw 9. The clamping disk 25 has on its upper surface a thin central boss which serves to center the suspension spring 33 as will be explained later. This boss is nearly the same thickness as the thin suspension spring and therefore is not clearly shown on the drawing. Another clamping disk 31, of the same outside diameter as the disk 25, serves to clamp the suspension spring 33 tightly between the two disks 25 and 31 at their outer edge. The top clamping disk 31 has a shallow conical depression in its lower surface to insure that the suspension spring is clamped definitely at the outer edge of the disks 25 and 31 so as to prevent uncertainty in the frequency of the suspended system. Each of the elements 31, 25 and 20 are drilled with an eccentric hole through which the screw 34 passes and is threaded into the bottom of yoke 15. The top disk 31 is countersunk for the heads of screws 9 and 34. The clamping disks 25 and 31 as well as screws 9 and 34 are made of non-magnetic material preferably of light weight such as aluminum alloy. The entire assembly is thus held firmly together in proper alignment by the screw 34, whereupon the assembly can be set into the case 10 and tightly clamped therein by the screw 9.

A coil form 36 is suspended in the air gap by means of a flat suspension spring 33. The coil form is conveniently made of non-magnetic material, and may conveniently be of aluminum alloy so that eddy currents therein will to a substantial degree damp the motion of the suspended system. The coil form 36 is in the form of a flanged ring with a recess turned in its outer cylindrical surface into which is wound insulated wire forming the pick-up coil 37. After winding, the coil is impregnated with cement so that coil and coil form become a monolithic structure. The axial length of the coil is made slightly more than the axial dimension of the pole face 18 of the magnet 16 and the radial thickness of coil and coil form is such as to allow only enough clearance in the air gap for free movement of the suspended system.

The flange of the coil form is drilled and tapped for four screws 67, 68, 39 and 40 whose location is best shown in Figure 1. These four screws serve to clamp the suspension spring to the coil form. The suspension spring 33 is cut or stamped from thin non-magnetic sheet spring stock, preferably beryllium copper properly heat treated. The spring is in the shape of an outer ring 40 which fits snugly into a recess 41 counterbored on the upper face of the flange of the coil form, and an inner disk 42 which fits between the clamping disks 25 and 31 and which has a central hole to fit snugly over the slight boss of disk 25, the rings 40 and 42 being connected by arms 44 and 46 which act as cantilever springs. The entire suspension spring comprising ring 40, disk 42, and arms 44 and 46 are cut or stamped as one piece. The outer ring is clamped to the coil form by screws 67, 68, 39 and 40 with clamping blocks 47, 48 and 49, the latter being preferably of insulating material such as phenolic plastic or the like. The inner disk 42 of the suspension spring is clamped and centered on the magnet structure and thereby the coil form is accurately centered in the air gap. The axial dimensions of the clamping disk 25 and the coil form are such that the coil is centered when the suspended system is under the action of gravity, the spring of course being under a slight sag which can be partially or entirely overcome by initially giving the unstressed arms 44 and 46 an appropriate slight upward deformation.

The ends of the coil 37 are brought out adjacent the block 49, carried through small holes 50 in this block, and are soldered to flexible leads 51 and 52. Two smaller blocks 53 and 54, which serve to support the ends of the leads 51 and 52, are riveted or otherwise fastened to the suspension spring. The block 54 serves as a terminal block for connecting the coil ends to the flexible leads, and block 53 serves as a supporting block to prevent the transfer of strains from the outside connections to the lead wires 51 and 52. The wires 51 and 52 are held in place on the suspension spring arms 44 and 46 by cementing or tying with thread through two small holes in the springs as indicated at 63 and 64. The leads 51 and 52 being flexible add substantially no stiffness to the spring arms 44 and 46 on which they are carried.

A junction block 55 is fastened to the outer rim of the flux-return yoke 15, space for the block being made available in the case 10 because the active operating element is eccentrically mounted in the case as previously indicated. The block 55 is conveniently used to complete connections from leads 51 and 52 to other electrical components and to sealed terminals 56 which carry the output of the seismometer to an external cable (not shown) in conventional manner. An eye 59 and safety chain are used to handle the seismometer and avoid strains on the connecting cable. Connections are also made on the block 55 to the hum-bucking circuit as will be explained. Details of the actual connections are not shown on Figures 1 and 2. The wiring is shown schematically in Figure 3, to which reference will be made later, the various components 58, 59 and 60 (not shown in Figures 1 and 2) being conveniently mounted on the block 55 in conventional manner.

In the annular region around the boss of the magnet there is wound a coil 57 whose leads 65 pass through holes in the rim of yoke 15 to connections on the block 55 as shown in Figure 2. The coil 57 is wound on the magnet before assembly of the magnet structure, a metal disc jig (not shown) being temporarily clamped to the lower end of magnet 16 in order to prevent turns of wire from spilling off the otherwise open lower end during the winding operation. An annular thin paper disk 61 prevents adherence of the coil to the jig disk and subsequently serves to insulate the coil from the yoke 15. The coil 57 is impregnated with cement while it is still on the winding jig, the cement serving to electrically insulate and to mechanically bond the coil tightly to the magnet 16. This construction adds to the mechanical strength of magnet 16 so that any cracks which might develop in the Alnico magnet will cause no harm. Subsequent to assembly of the coil and magnet structure a strong direct current is applied to the coil through its leads for a short time, and this provides the M.M.F. for magnetizing the permanent magnet structure. Subsequently the magnet structure must be remagnetized in this manner each time it is for any reason dissembled.

The fixed coil 57 is also used for hum-bucking, i.e. as a source of E.M.F. arising from stray external magnetic fields which also affect the suspended coil 37, and for this purpose the coil 57 is connected in the seismometer circuit and to the output terminals 56 as shown in Figure 3. By using the coil 57 both for magnetizing the magnet and for hum-bucking purposes a substantial weight saving is accomplished. In connecting the suspended coil 37 and the fixed coil 57 to the seismometer output terminals 56 it is preferred to connect each coil in series with a separate resistor 58 and 59 and then parallel these coil circuits as shown in Figure 3. The resistor 59 which is in series with the fixed coil has a condenser 60 connected across it and its capacity is adjusted in value to adjust the phase of the voltage in the humbucking branch circuit so that the pick-up voltage in the two branch circuits are in opposition to neutralize any pick-up due to stray A.-C. fields. The E.M.F. generated by motion of the suspended coil 37 in the air gap is of course not neutralized and appears at the seismometer terminals. The resistance 58 in the circuit may be used for damping purposes as is conventional in electromagnetic seismometers, but it has been found that use of the conducting coil form 36 for this purpose is more efficient. By properly adjusting the thickness of the metal coil form on which the coil 37 is wound the proper amount of damping is easily obtained. By thus employing the coil form for damping purposes, no useable part of the air gap is wasted and there results a seismometer of optimum sensitivity.

The above-described seismometer is characterized by high sensitivity resulting from the fact that the air gap has a volume which is large compared to other dimensions of the device and the entire air gap serves for useful electromagnetic purposes, high fidelity in following the ground motion due to the fact that the instrument consists almost wholly of active operating mechanism without unnecessary weight and the fact that it has a large area of contact with the ground, low sensitivity to wind noise due to its squat form, light overall weight due to a structure which employs a single coil for both magnetizing and hum-bucking, and sturdy construction which resists damage from shock in field handling.

What I claim as my invention is:

1. An electromagnetic seismometer comprising an inner generally disk-shaped magnet of substantially greater radius than axial dimension and having a cylindrical outer face and a central boss with a plane face, said magnet being permanently magnetized in a radial direction so as to have a homopolar outer face and a central pole at said plane face, an outer cup-shaped magnetically soft member having its inside bottom surface in magnetic engagement with the central pole of said magnet and having its rim spaced radially from the outer face of said magnet to form an annular air gap, and a coil elastically suspended for axial movement in said air gap.

2. An electromagnetic seismometer comprising an inner annular magnet of substantially greater radial dimension than axial dimension and having a body portion with a central annular boss, said magnet having a cylindrical outer face whose axial dimension is less than the axial dimension of the magnet at its inner radius, said magnet being permanently magnetized in a radial direction so as to have a homopolar outer face and an opposite pole at its central region, an outer cup-shaped magnetically soft member having its inside bottom surface in magnetic engagement with the central pole of said magnet and having its rim spaced from the outer face of said magnet to form an annular air gap, and a coil elastically suspended for axial movement in said air gap.

3. An electromagnetic seismometer comprising an inner annular magnet of substantially greater radial dimension than axial dimension and having a body portion with a cylindrical outer face whose axial dimension is less than the axial dimension of the magnet at its inner radius, said magnet being permanently magnetized in a radial direction so as to have a homopolar outer face and an opposite pole at its central region, an annular cup-shaped magnetically soft member having its inside bottom surface in magnetic engagement with the central pole of said magnet and having its rim spaced radially from the outer face of said magnet to form an annular air gap, a fixed coil wound in the annular space between the body of said magnet and the bottom of the cup-shaped member, and a movable coil elastically suspended for axial movement in said air gap.

4. An electromagnetic seismometer comprising an inner annular magnet of substantially greater radial dimension than axial dimension and having a body portion with a cylindrical outer face whose axial dimension is less than the axial dimension of the magnet at its inner radius, said magnet being permanently magnetized in a radial direction so as to have a homopolar outer face and an opposite pole at its central region, an annular cup-shaped magnetically soft member having its inside bottom surface in magnetic engagement with the central pole of said magnet and having its rim spaced radially from the outer face of said magnet to form an annular air gap, a fixed coil wound in the annular space between the body of said magnet and the bottom of the cup-shaped member, said fixed coil initially serving for magnetizing said magnet and subsequently serving as a means for supplying E.M.F. which is proportional to interference from external magnetic fields, and a movable coil elastically suspended for axial movement in said air gap.

5. An electromagnetic seismometer comprising an inner annular magnet of substantially greater radial dimension than axial dimension and having a body portion with a cylindrical outer face whose axial dimension is less than the axial dimension of the magnet at its inner radius, said magnet being permanently magnetized in a radial direction so as to have a homopolar outer face and an opposite pole at its central region, an annular cup-shaped magnetically soft member having its inside bottom surface in magnetic engagement with the central pole of said magnet and having its rim spaced radially from the outer face of said magnet to form an annular air gap, a fixed coil wound in the annular space between the body of said magnet and the bottom of the cup-shaped member, a movable coil elastically suspended for axial movement in said air gap, a pair of output terminals, means interconnecting said fixed coil and said movable coil to each other and to said output terminals to substantially cancel pick-up from external magnetic fields at the output terminals.

6. An electromagnetic seismometer comprising an inner annular magnet of substantially greater radial dimension than axial dimension and having a cylindrical outer face whose axial dimension is less than the axial dimension of the magnet at its inner radius thus forming a central boss on one end of the annular magnet, said magnet being permanently magnetized in a radial direction so as to have a homopolar outer face and an opposite pole at said boss, an annular cup-shaped ferromagnetic member having its inside bottom surface in magnetic engagement with said boss and having the inside surface of its rim spaced radially from the outer face of said magnet to form an annular air gap, a fixed coil wound around said boss, a movable coil elastically suspended for axial movement in said air gap, a pair of output terminals, a reactive network, means connecting said fixed coil and said reactive network and said movable coil to the output terminals so that magnetic pick-up is substantially cancelled and vibration-induced signal appears at the output terminals.

7. An electromagnetic seismometer comprising an inner annular magnet of substantially greater radial dimension than axial dimension and having a body portion with a cylindrical outer face whose axial dimension is less than the axial dimension of the magnet at its inner radius, said magnet being permanently magnetized in a radial direction so as to have a homopolar outer face and an opposite pole at its central region, an annular cup-shaped magnetically-soft member having its inside bottom surface in magnetic engagement with the central pole of said magnet and having its rim spaced radially from the outer face of said magnet to form an annular air gap, a fixed coil wound in the annular space between the body of said magnet and the bottom of the cup-shaped member, said fixed coil having sufficient turns and current-carrying capacity to substantially fully magnetize said magnet, a movable coil elastically suspended for axial movement in said air gap, a pair of output terminals, and circuit means connecting said fixed coil and said movable coil respectively in parallel branches to said output terminals.

8. An electromagnetic seismometer comprising an inner annular magnet of substantially greater radial dimension than axial dimension and having a cylindrical outer face whose axial dimension is less than the axial dimension of the magnet at its inner radius thus forming a central boss on one end of the annular magnet, said magnet being permanently magnetized in a radial direction so as to have a homopolar outer face and an opposite pole at said boss, an annular cup-shaped ferromagnetic member having its inside bottom surface in magnetic engagement with said boss and having the inside surface of its rim spaced radially from the outer face of said magnet to form an annular air gap, a fixed coil wound around said boss, a movable coil elastically suspended for axial movement in said air gap, a pair of output terminals, a reactive network, circuit means connecting said fixed coil and said movable coil respectively in parallel branches to said output terminals, and means connecting said reactive network in one of said parallel branches.

References Cited in the file of this patent
UNITED STATES PATENTS

| | | |
|---|---|---|
| 2,286,386 | Silverman | June 16, 1942 |
| 2,316,616 | Powell | Apr. 13, 1943 |
| 2,417,077 | Hoover | May 11, 1947 |
| 2,582,769 | Congdon | Jan. 15, 1952 |
| 2,596,048 | Severs | May 6, 1952 |
| 2,651,769 | Stafford | Sept. 8, 1953 |
| 2,745,085 | McCarty | May 8, 1956 |
| 2,748,370 | Baltosser | May 29, 1956 |